US012719210B2

(12) United States Patent
Campbell et al.

(10) Patent No.: US 12,719,210 B2
(45) Date of Patent: Aug. 25, 2026

(54) SELF-ALIGNING MODULAR ELECTRICAL CONNECTION SYSTEM WITH A COMMON CARRIER

(71) Applicant: Aptiv Technologies AG, Schaffhausen (CH)

(72) Inventors: Jeffrey S. Campbell, West Bloomfield, MI (US); Wesley W. Weber, Lapeer, MI (US); Christopher G. Reider, Canfield, OH (US)

(73) Assignee: Aptiv Technologies AG, Schaffhausen (CH)

( * ) Notice: Subject to any disclaimer, the term of this patent is extended or adjusted under 35 U.S.C. 154(b) by 356 days.

(21) Appl. No.: 18/584,343

(22) Filed: Feb. 22, 2024

(65) Prior Publication Data

US 2024/0291199 A1 Aug. 29, 2024

Related U.S. Application Data

(60) Provisional application No. 63/447,695, filed on Feb. 23, 2023.

(51) Int. Cl.
*H01R 13/629* (2006.01)
*H01R 13/514* (2006.01)
(Continued)

(52) U.S. Cl.
CPC ......... *H01R 13/629* (2013.01); *H01R 13/514* (2013.01); *H01R 13/639* (2013.01); *H01R 43/26* (2013.01); *H01R 2201/26* (2013.01)

(58) Field of Classification Search
CPC .. H01R 13/629; H01R 13/514; H01R 13/639; H01R 43/26; H01R 2201/26; B60R 16/0239
See application file for complete search history.

(56) References Cited

U.S. PATENT DOCUMENTS 4,963,098 A * 10/1990 Myer .................. H01R 13/514 439/378
5,805,402 A * 9/1998 Maue .................. B60R 16/0207 361/115
(Continued)

FOREIGN PATENT DOCUMENTS

EP 0330497 A1 * 8/1989 ........... H01R 13/514
JP 2014127308 A 7/2014
(Continued)

OTHER PUBLICATIONS

U.S. Appl. No. 18/377,937; filed Oct. 9, 2023.
"Extended European Search Report Received for Application No. 24159299.7 mailed on Jun. 27, 2024", 12 Pages.

*Primary Examiner* — Travis S Chambers
(74) *Attorney, Agent, or Firm* — Billion & Armitage

(57) ABSTRACT

An electrical connection system is described which includes a common carrier. The common carrier includes a main channel configured to retain a cable bundle and a plurality of side channels that facilitate coupling of at least some cables of the cable bundle to an electronic control unit (ECU). The side channels are configured to retain a connector carrier configured to carry a pair of connectors slidable in each side channel between a pre-staged position in preparation for mating and a mated position which mates terminals carried by the pair of connectors and locks the pair of connectors to the ECU.

20 Claims, 16 Drawing Sheets

(51) Int. Cl.
*H01R 13/639* (2006.01)
*H01R 43/26* (2006.01)

(56) References Cited

U.S. PATENT DOCUMENTS

| | | | |
|---|---|---|---|
| 2019/0288451 | A1 | 9/2019 | Peterson et al. |
| 2022/0376436 | A1 | 11/2022 | Campbell et al. |
| 2023/0087909 | A1 | 3/2023 | Peterson et al. |

FOREIGN PATENT DOCUMENTS

| | | | | | |
|---|---|---|---|---|---|
| JP | 2014127309 | A | | 7/2014 | |
| TW | 201630278 | A | * | 8/2016 | ........... H01R 25/006 |
| WO | 2016068014 | A1 | | 5/2016 | |

* cited by examiner

FIG. 3B
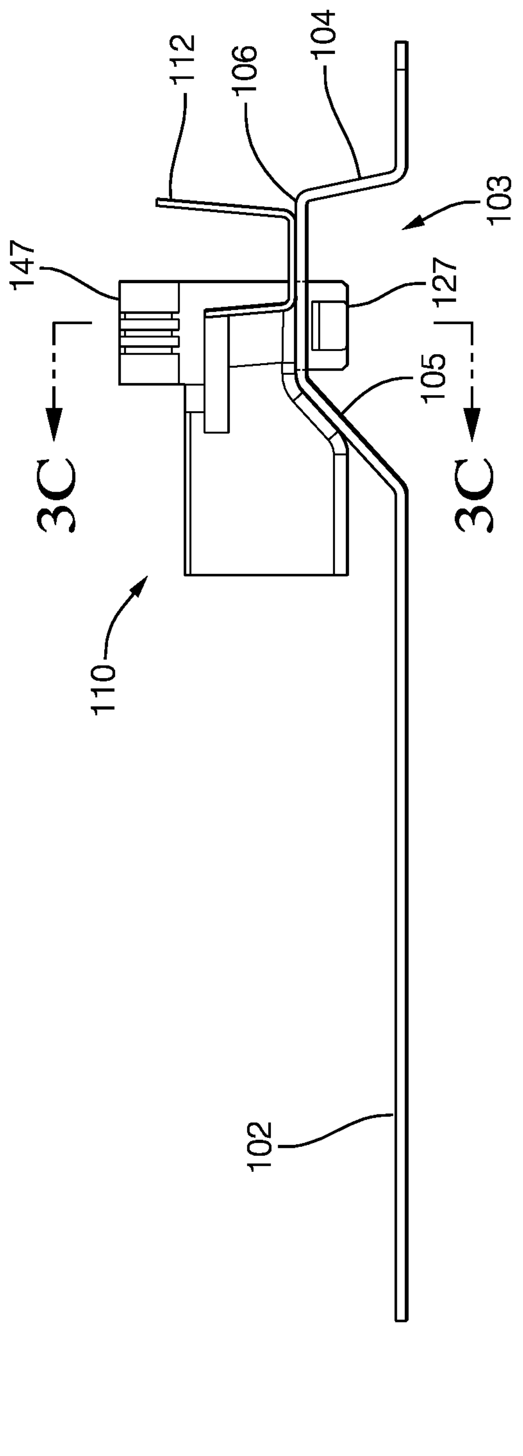
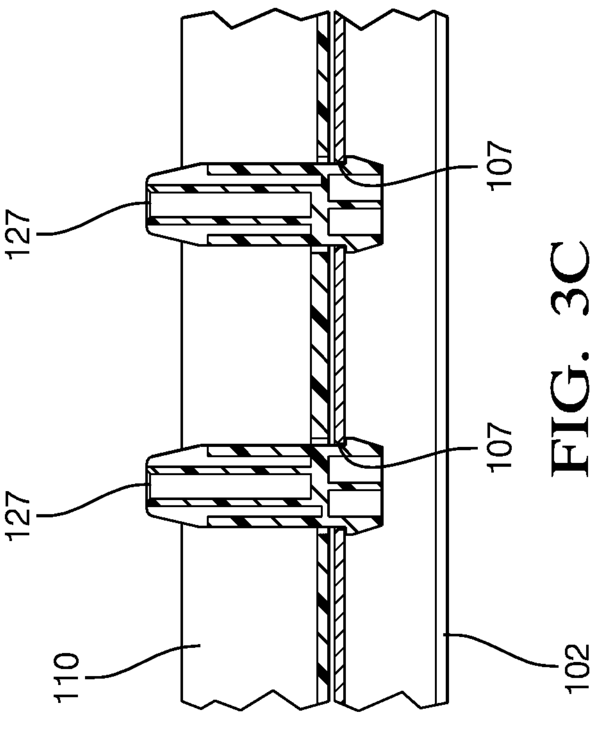
FIG. 3C

SELF-ALIGNING MODULAR ELECTRICAL CONNECTION SYSTEM WITH A COMMON CARRIER

PRIORITY

This application is a non-provisional application that claims priority to provisional application No. 63/447,695 titled "SELF-ALIGNING MODULAR ELECTRICAL CONNECTOR SYSTEM WITH MATING ASSURANCE FEATURE AND COMMON CARRIER FOR ROBOTIC ASSEMBLY," filed Feb. 23, 2023, the entire contents of which are incorporated herein by reference.

BACKGROUND

Wiring harnesses are commonly used to support interconnection of distributed electrical system(s) and/or components in vehicular applications. A wiring harness may include cabling that distributes signal, power, and/or data signals to different physical locations within a vehicle via connectors coupled to the wiring harness.

In many applications, installing a vehicle wiring harness is a complex process, which requires significant effort to couple connectors to establish electrical connections between cables of the wiring harness and other components and/or systems associated with the vehicle. A need exists for electrical connection systems that are easy and or less expensive to reliably install than traditional electrical connection systems.

SUMMARY

This application is directed to vehicle electrical systems, and more particularly, wiring harnesses and electrical connector systems associated with wiring harnesses that are adapted to minimize effort needed to install a vehicle electrical system. The various examples of wiring harnesses and electrical connection systems described may be particularly suited to robotic installation, representing a significant improvement over known connection systems.

For example, an electrical connection system is described. The electrical connection system includes a cable bundle that includes a plurality of cables, a first connector that carries a first pair of terminals that terminate a first pair of the plurality of cables, and a second connector that carries a second pair of terminals that terminate a second pair of the plurality of cables. The electrical connection system further includes a connector carrier configured to retain the first connector and the second connector, and a common carrier configured to be secured to a vehicle surface. The common carrier includes a main channel configured to retain the bundle of cables arranged in a first direction, and a side channel that retains the connector carrier in the side channel such that the connector carrier is moveable from a pre-staged position in the side channel to a staged position which: mates the first pair of terminals carried by the first connector, mates the second pair of terminals carried by the second connector; and locks the first connector and the second connector to an Electronic Control Unit (ECU).

As another example, a method is described. The method includes securing a common carrier at a location on a vehicle assembly surface. The method further includes retaining a cable bundle in a main channel of the common carrier arranged in a first direction, the method further includes retaining, in a connector carrier, a first connector that carries a first pair of terminals that terminate a first pair of cables of the cable bundle; and a second connector that carries a second pair of terminals that terminate a second pair of cables of the cable bundle. The method further includes arranging the connector carrier in a side channel of the common carrier that retains the connector carrier moveable in a second direction from a pre-staged position to a staged position. The method further includes arranging an Electronic Control Unit (ECU) on the vehicle assembly surface adjacent to the common carrier. The method further includes gripping the connector carrier. The method further includes moving the connector carrier, retained in the side channel, from the pre-staged position to the staged position, thereby mating the first pair of terminals and the second pair of terminals, and locking the first connector and the second connector to the ECU.

According to another example, a common carrier is described. The common carrier includes a main channel configured to retain a cable bundle arranged in a first direction. The common carrier further includes a side channel configured to retain a connector carrier that retains a first connector that terminates a first pair of cables of the cable bundle and a second connector that terminates a second pair of cables of the cable bundle, wherein the connector carrier is moveable in a second direction from a pre-staged position in the side channel to a staged position that mates terminals of the first and second connectors, and lock the first and second connectors.

BRIEF DESCRIPTION OF THE DRAWINGS

The present invention will now be described, by way of example with reference to the accompanying drawings, in which:

FIG. 3B is a side view showing a common carrier mounted on a substrate of a vehicle assembly according to some embodiments.

FIG. 3C is a cross sectional view showing a common carrier mounted on a substrate of a vehicle assembly according to some embodiments.

DETAILED DESCRIPTION

Figure 1:
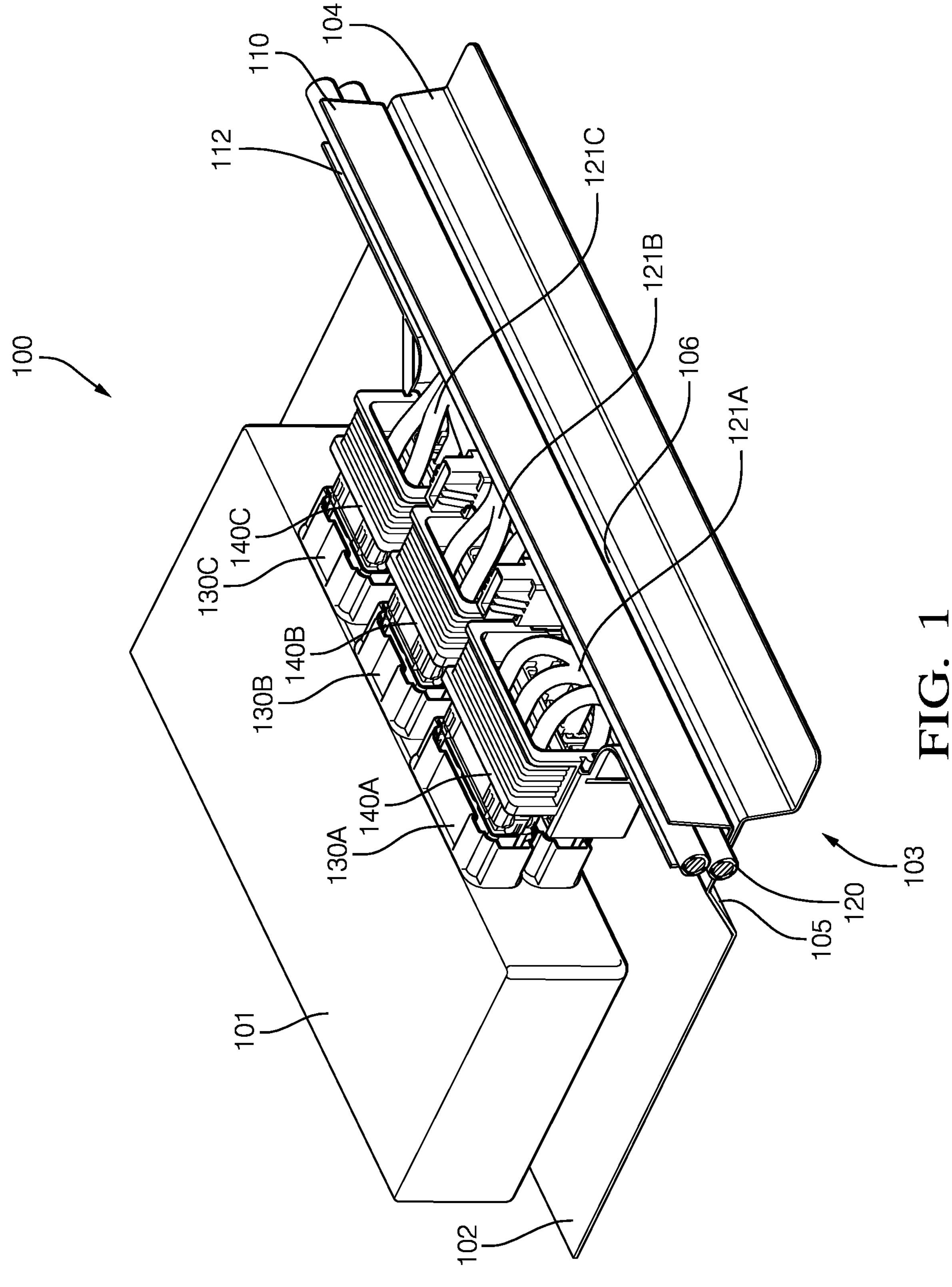
FIG. 1 is a perspective view showing one example of an electrical connection system according to some embodiments.

FIG. 1 is a perspective view of an electrical connection system 100, installed as part of a vehicle assembly according to some embodiments. Connection system 100 includes a common carrier 110 and a plurality of connector carriers 140A-140C configured to interface with the common carrier 110 to facilitate electrical connection between cable groupings 121A-121C of a cable bundle 120 of a wiring harness and terminals of an Electronic Control Unit (ECU) 101 as part of a vehicle electrical system. It is appreciated that the term ECU is used generically and may refer to any type of electrical or electronics device that requires a power and/or data connection with cables of the wiring harness. In the connection system 100, the common carrier 110, connector carriers 140A-140C, and connectors (not shown in FIG. 1) carried by the connector carriers 140A-140C work together to facilitate reliable interconnection between cables of the cable bundle 120 and components housed in the ECU 101. In some examples, connection system 100 may be particularly suitable to installation by a robotic operator, such as a robotic actuator configured to install connection system 100.

Figure 2A:
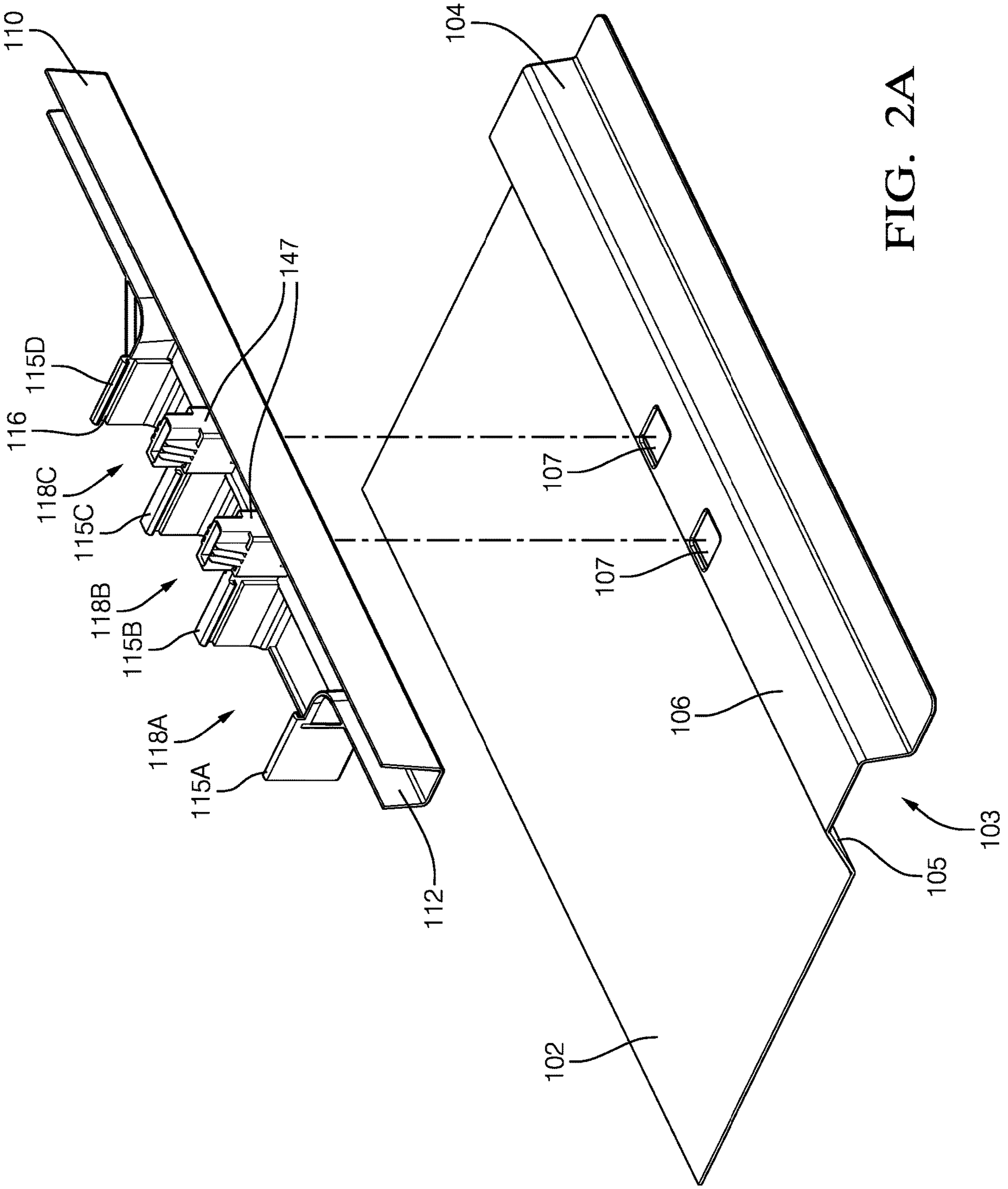
FIG. 2A is an exploded view showing a common carrier and a substrate of a vehicle assembly according to some embodiments.
Figure 2B:
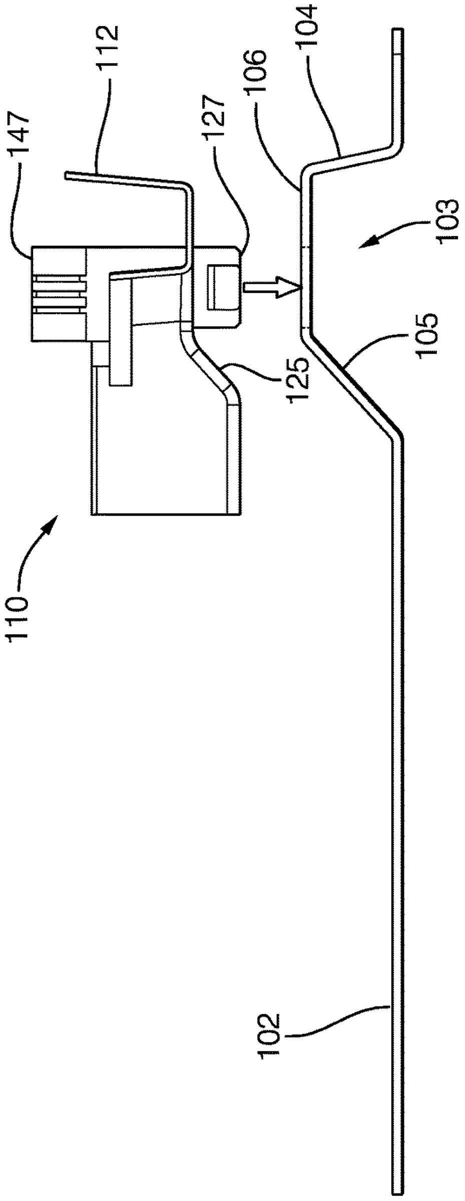
FIG. 2B is an exploded side view showing a common carrier and a substrate of a vehicle assembly according to some embodiments.
Figure 3A:
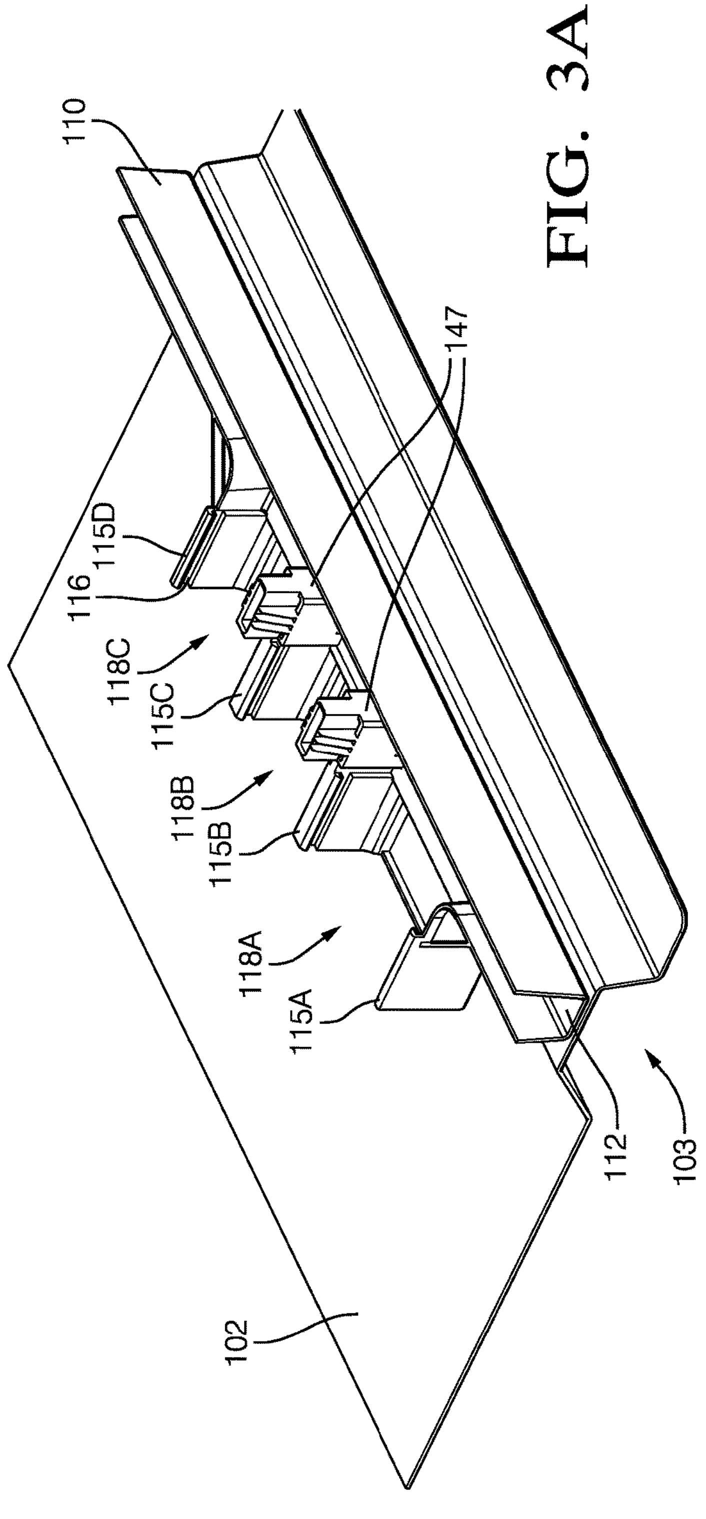
FIG. 3A is a perspective view showing a common carrier mounted on a substrate of a vehicle assembly according to some embodiments.

FIG. 2A is a perspective view, and FIG. 2B is a side view, showing a common carrier 110 and a substrate 102 upon which the common carrier 110 is configured to be mounted. FIG. 3A depicts a perspective view of the common carrier 110 mounted to the substrate 102. FIG. 3B depicts a side view of the common carrier 110 mounted to the substrate 102, and FIG. 3C shows a cross section view (taken along the cut lines 3C-3C depicted in FIG. 3B) of common carrier 110 mounted to the substrate 102.

Common carrier 110 may be mounted to a substrate 102 of a vehicle assembly and used to secure cables of a wiring harness in a desired position, as well as to facilitate electrical connection between cables of the wiring harness and ECU 101 as shown in FIG. 1. As shown in FIG. 2A, the common carrier 110 includes a main channel 112 and a plurality of side channels 118A-118C. The main channel 112 is configured to carry a cable bundle 120 of a wiring harness, which may include many cables, arranged in a first direction. The common carrier 110 further includes side channels 118A-118C, which are configured to enable coupling of at least some cables of the cable bundle 120 to one of more components of a vehicle electrical system, such as components housed by ECU 101.

Substrate 102 depicted in FIG. 2A may present a surface of a vehicle assembly, for example a vertical or horizontal surface of a vehicle assembly. Substrate 102 may be formed of sheet metal material such as aluminum, or other suitable material for use as in a vehicle assembly, and may be a vertical or horizontal structure that is part of a floor, a ceiling, a side (wall) surface, or other structure of a vehicle assembly.

Common carrier 110 is adapted to be secured to the substrate 102 at a desired position. For example, as shown in the example of FIG. 2B, common carrier 110 includes a pair of protrusions 127 configured to be snap fit into a corresponding pair of openings 107 formed in the substrate 102. Openings 107 may be particularly sized and shaped to receive the protrusions 127 and secure the common carrier 110 in position on the substrate 102.

In the FIG. 2B example, substrate 102 includes structures configured to facilitate the reliable coupling of common carrier 110 to the substrate 102. For example, substrate 102, which may be formed of a malleable material such as sheet metal, may be bent to present a defined contour for common carrier 110 to be mounted to. As shown in the FIG. 2B example, substrate 102 is bent in four positions to create a ridge 103. The ridge 103 includes a first side surface 104, a second side surface 105 opposed to the first surface 104, and top surface 106 supported by the first and second surfaces 104 and 105. The top surface 106 of ridge 103 includes the openings 107 configured to receive protrusions 127 to secure the common carrier 110, and has a width that corresponds to a width of a surface 128 of common carrier 110 arranged to rest on the top surface 106 when installed in position with protrusions 127. In some examples, common carrier 110 is configured to conform to a contour of the substrate 102 such that common carrier 110 is retained snugly on the substrate 102. For example, as shown in FIG. 2B, common carrier 110 includes an additional angled support surface 125, configured to confirm to an angle of side surface 104.

Figure 4A:
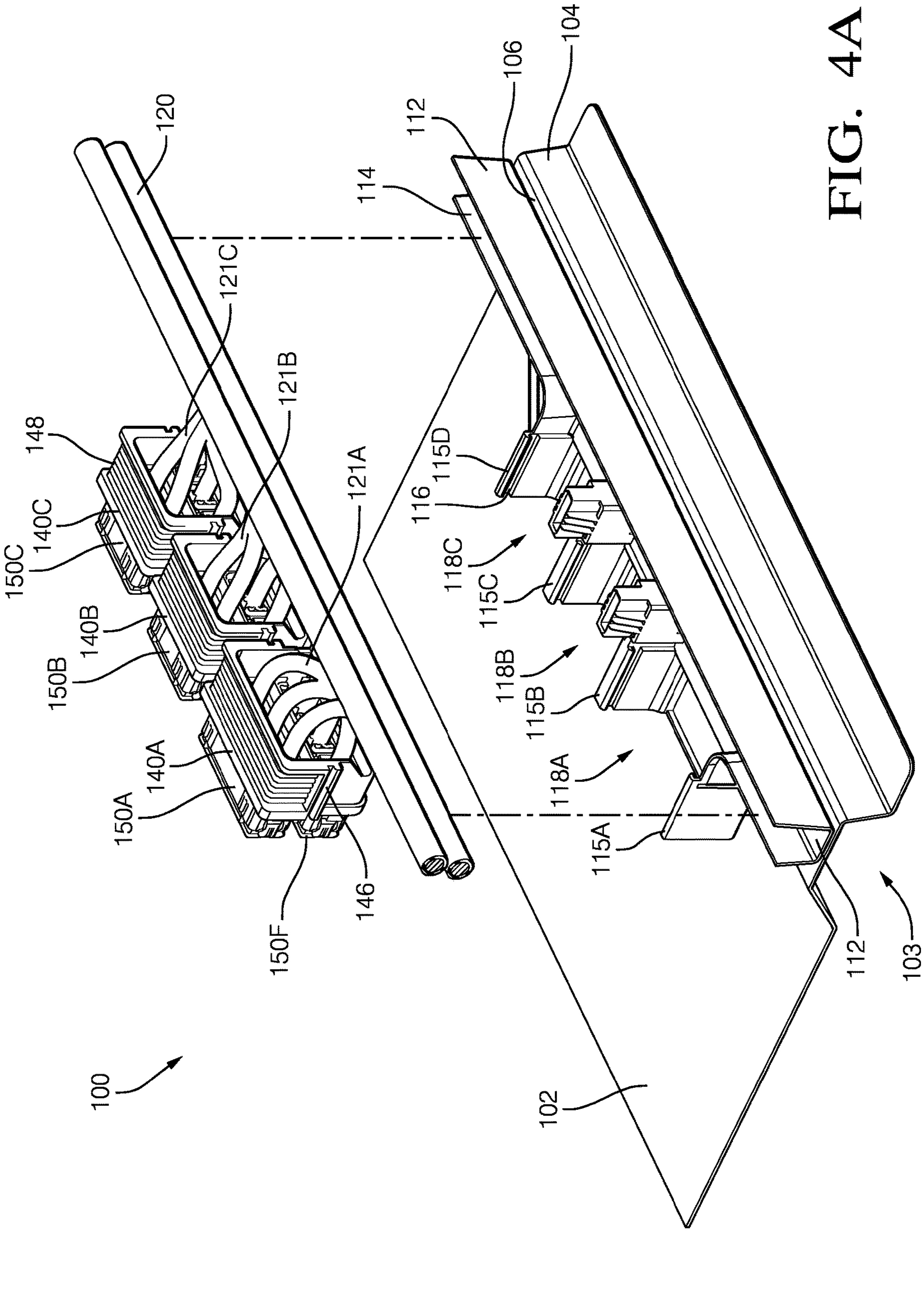
FIG. 4A is an exploded view showing a cable bundle of a wiring harness and a common carrier mounted on a substrate of a vehicle assembly according to some embodiments.
Figure 4B:
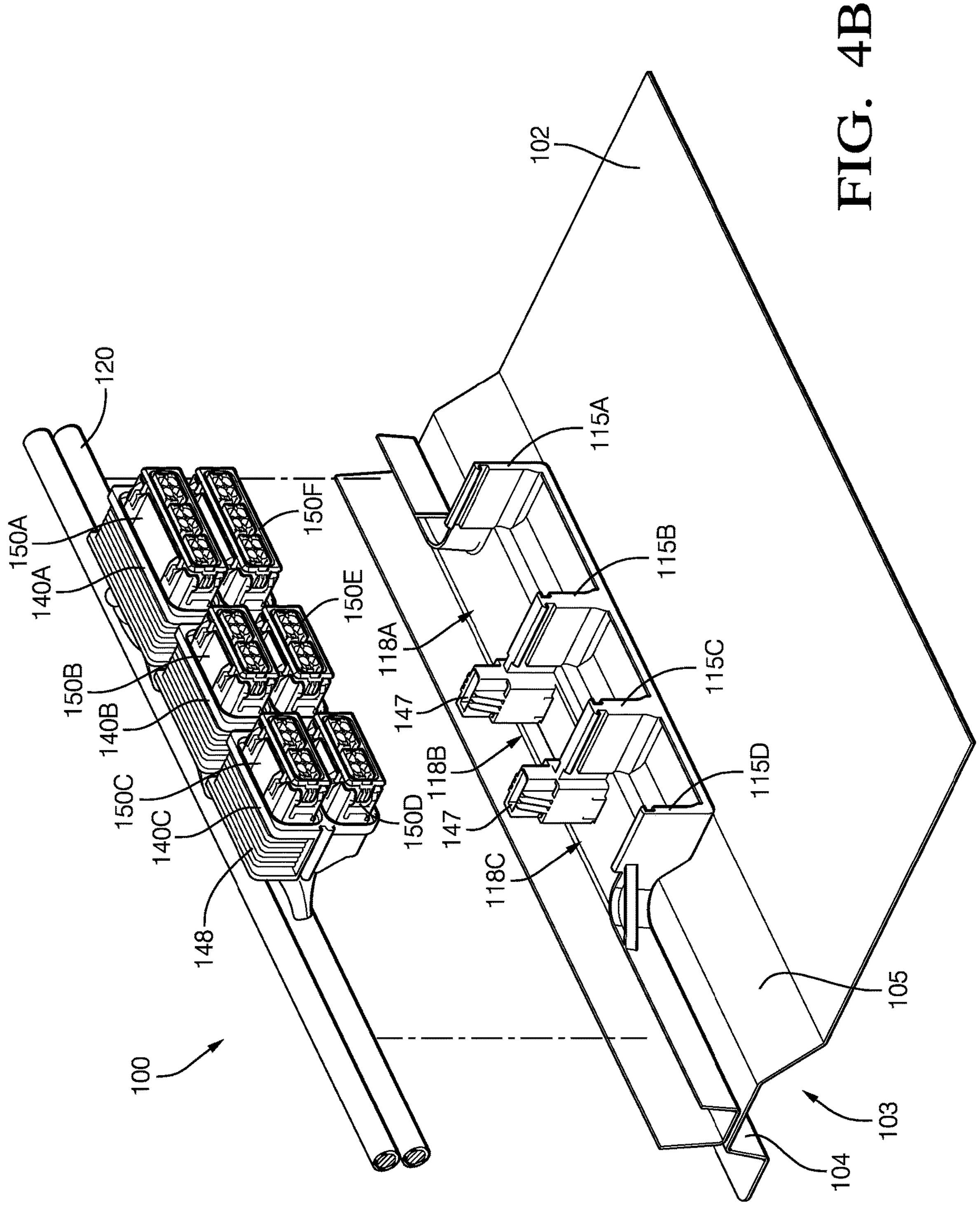
FIG. 4B is an opposed exploded view showing a cable bundle of a wiring harness and a common carrier mounted on a substrate of a vehicle assembly according to some embodiments.
Figure 5A:
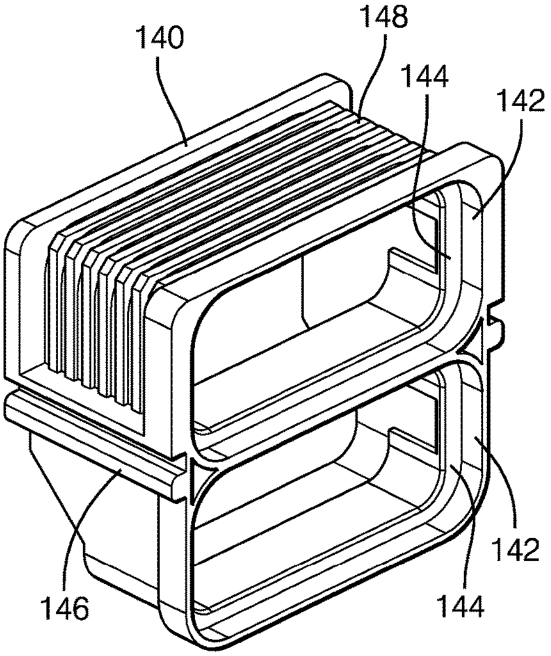
FIG. 5A is a perspective view showing a connector carrier according to some embodiments.
Figure 5B:
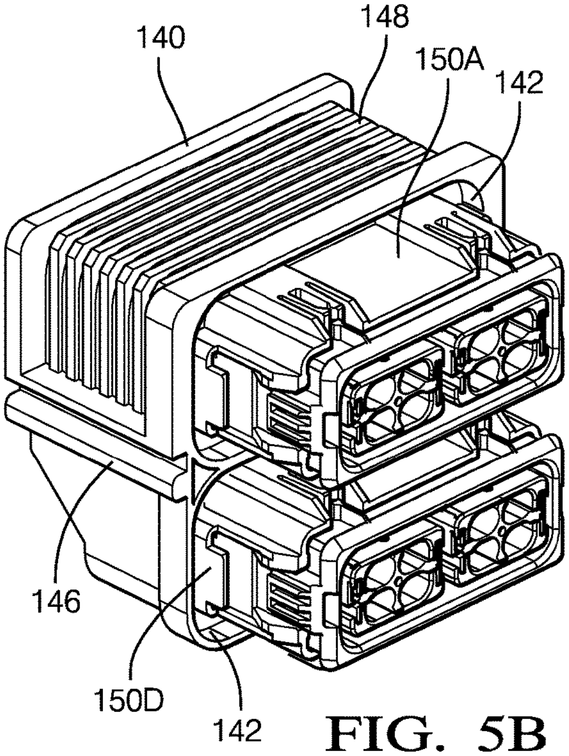
FIG. 5B is a perspective view showing a connector carrier retaining first and second connectors that each carry pairs of terminals according to some embodiments.
Figure 6A:
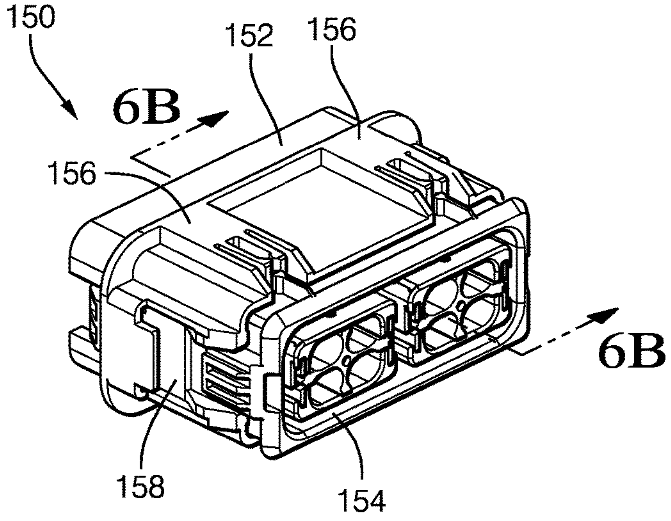
FIG. 6A is a perspective view showing a resettable latching connector mated according to some embodiments.
Figure 6B:
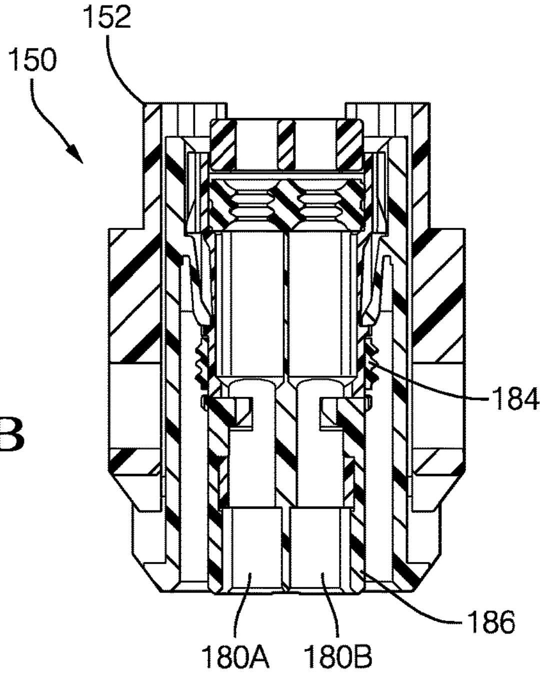
FIG. 6B is a cross sectional side view showing a resettable latching connector mated according to some embodiments.
Figure 6C:
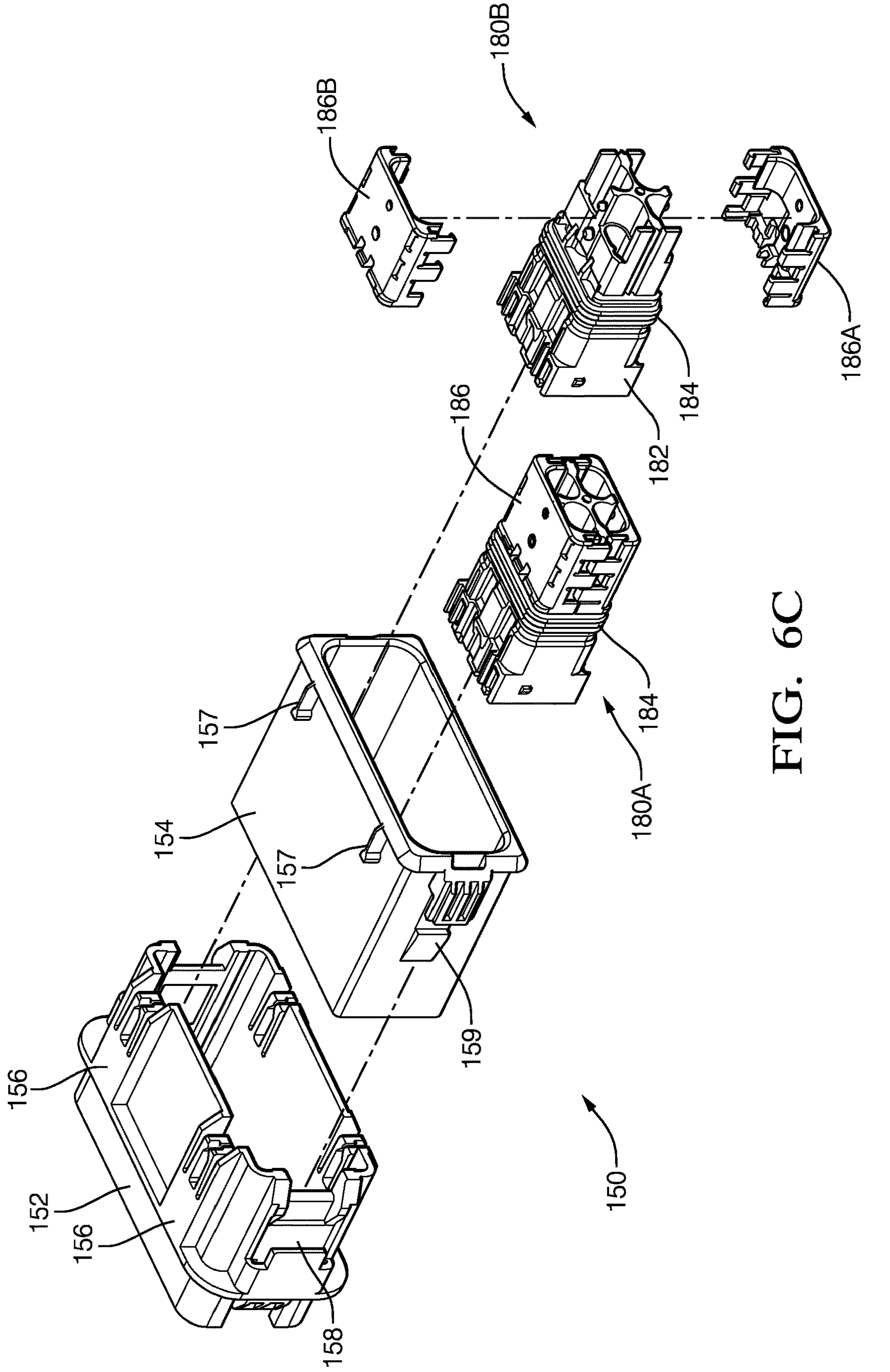
FIG. 6C is an exploded view showing components of a resettable latching connector according to some embodiments.

FIG. 4A shows a perspective view of a cable bundle 120 before being installed in a common carrier 110 according to some embodiments. FIG. 4B shows an opposite perspective view of the cable bundle 120 before being installed in the common carrier 110. FIG. 5A shows one example of a connector carrier 140 that may be used as one or more of connector carriers 140A-140C depicted in FIGS. 4A and 4B, according to some embodiments. FIG. 5B depicts the connector carrier 140 depicted in FIG. 5A retaining two connectors 150A, 150D. One example of such a connector is depicted in FIGS. 6A-6C.

Referring to FIG. 4A, a cable bundle 120 includes a plurality of cables arranged in a first direction, and several groupings 121A-121C of cables are terminated by connectors 150A-150F to support electrical coupling. For ease of illustration, only two large cables are shown to represent the cable bundle 120. In practice, cable bundle 120 may include many more cables than depicted, some of which may be part of cable groupings 121A-121C. Other cables of the cable bundle 120 may not be arranged to be coupled to ECU 101, and instead may be coupled to other vehicle systems or components in other locations as part of the vehicle assembly.

As shown in FIG. 4A, each of the respective cable groupings 121A-121C includes a plurality of cables coupled to respective pairs of connectors 150A,150F; 150B,150E; and 150C,150D through a respective connector carrier 140A-140C that carry the pairs of connectors. In other examples not depicted, connector carrier 140A-140C may instead carry a single connector that supports multiple terminals or multiple pairs of terminals for mating. In still other examples, connector carriers 140A-140C may carry more than two connectors. In still other examples, connection system 100 may include a common carrier 110 that includes more, or fewer channels 118A-118C than shown in the depicted examples, for example a common carrier 110 may include two channels 118A, 118B that retain two connector carriers 140A and 140B, or may include four or more channels that retain four or more connector carriers.

Referring now to the FIG. 4B example, a connector carrier 140A is adapted to carry a first pair of connectors 150A and 150F, each of which are coupled to the ends of three of the six cables of cable grouping 121A through connector carrier 140A. Connector carrier 140B is adapted to carry a second pair of connectors 150B and 150E, each of which are coupled to the ends of a pair of the four cables of cable grouping 121B through connector carrier 140B. Like connector carrier 140B, connector carrier 140C carries a third pair of connectors 150C and 150D, each of which are coupled to ends of a pair of the four cables of cable grouping 121C through connector carrier 140C.

Referring now to FIGS. 5A and 5B, which depict one example of a connector carrier 140, each of connector carriers 140A-140C may be configured to carry a pair of electrical connectors, each of which carry at least a pair of conductor terminals for mating. As shown in FIG. 5A, each connector carrier 140 includes a pair of channels 142 that each include a ledge 144. As shown in FIG. 5B, each channel 142 is configured to retain a connector 150A, 150D for mating, against the ledge 144. In some examples, a connector carrier 140 may have a width that corresponds to number of terminals carried by the pair of connectors. For example, a connector carrier 140C depicted in FIG. 5B may have a width that corresponds to a width of connectors 150C and 150D, which are each configured to carry a pair of terminals for mating. In other examples, a connector carrier 140 may be formed with wider channels 142 to accommodate a pair of connectors that support more than a pair of terminals, such as connector carrier 140A depicted in FIGS. 4A and 4B which is configured to support three terminals for mating.

Referring again to FIGS. 4A and 4B, common carrier 110 includes a main channel 112 configured to retain cable bundle 120, and a plurality of side channels 118A-118C that are each configured to accommodate coupling of cable groupings 121A-121C, for example to ECU 101. As shown in FIG. 4B, the main channel 112 retains the cable bundle 120 arranged in a first direction, and the side channels 118A-118C extend laterally relative to the substrate 102 in a second direction different than the first direction, perpendicular to the first direction. Each of side channels 118A-118C has a width to accommodate a corresponding one of the connector carriers 140A-140C. For example, side channels 118B and 118C in the FIG. 4A-4B example each have widths that correspond to a width of connector carriers 140B and 140C, each of which retain a pair of connectors (150B, 150E, and 150C, 150D, respectively) that each carry a pair of terminals for mating. In contrast, side channel 118A has a width that corresponds to a width of connector carriers 140A, 140F, which each retain a pair of connectors 150A, 150F that each carry three terminals for mating.

Each of side channels 118A-118C is configured to retain the respective connector carrier 140A-140C, moveable (e.g., slidable) in the side channel 118A-118C, for mating. As shown in FIG. 4B, each of the side channels 118A-118C is defined by a pair of the walls 115A-115D of the common carrier 110. For example, side channel 118A is defined by walls 115A and 115B, side channel 118B is defined by walls 115B and 115C, and side channel 118C is defined by walls 115C and 115D.

Each of the side channels 118A-118C may include tracks 116 defined in opposed walls 115A-115D. The tracks 116 are sized and shaped to engage with a corresponding rails 146 defined each side of each of connector carriers 140A-140C to retain the connector carriers 140A-140C slidable in the side channels 118A-118C. The connector carriers 140A-140C may be configured to be slidable longitudinally in the side channels 118A-118C between a pre-staged position of the connection system in which the pair of connectors carried by each connector carrier 140A-140C are prepared for mating, and a staged position of the connection system 100 in which each the terminals carried by each pair of connectors are mated and the connectors are locked via the connector carriers 140A-140C.

As also shown in the examples of FIGS. 4A and 4B, common carrier 110 may optionally include one or more cable separators 147 arranged adjacent to the main channel 112. Cable separators 147 may operate to separate groupings 121A-121C of cables from the main channel 112 to the side channels 118A-118C. In some examples, the cable separators 147 may further include lock features that extend vertically upward above the main channel 112 and are configured to engage with corresponding lock features of a header cover (not shown) that covers the main channel 112 and/or the side channels 118A-118C.

Figure 7:
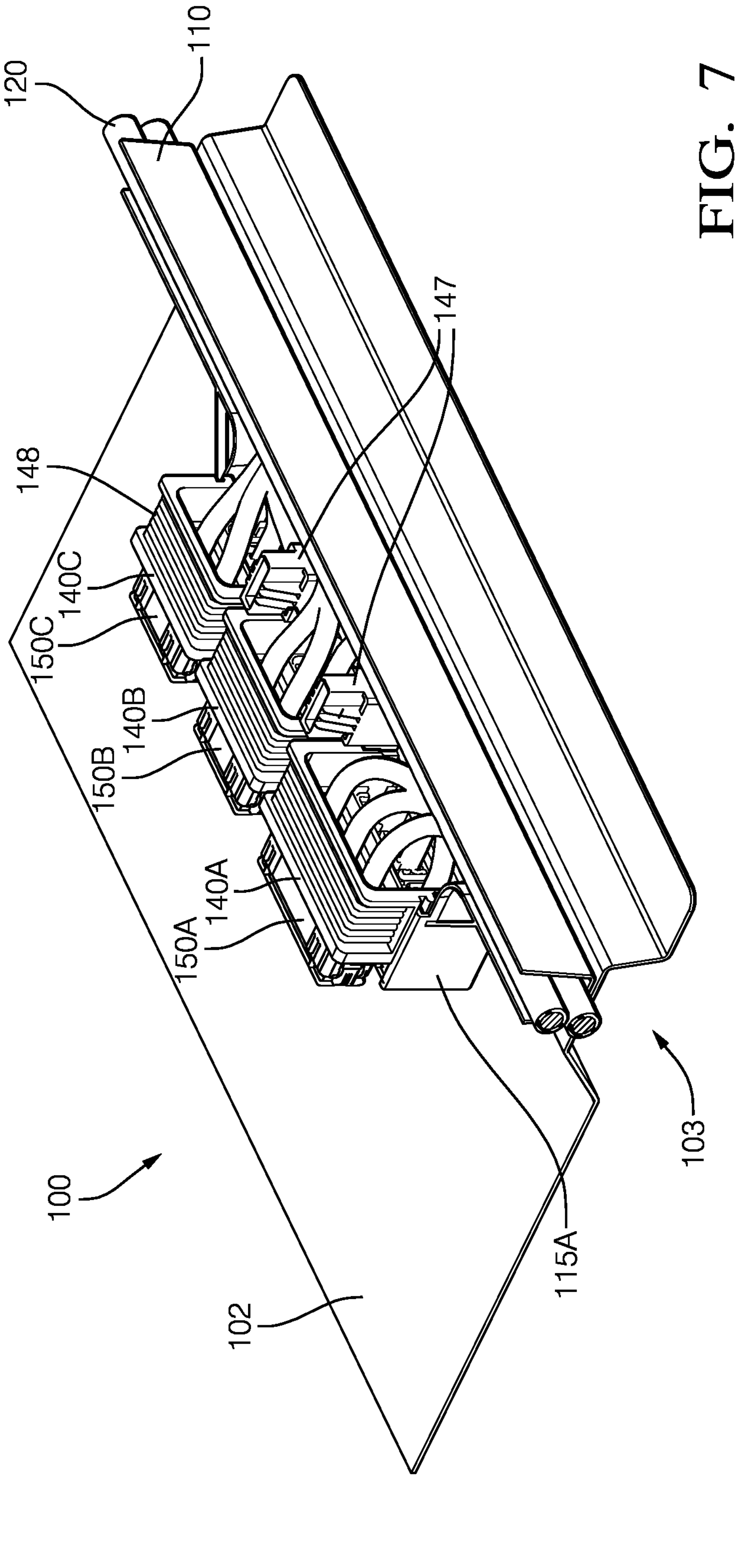
FIG. 7 is a perspective view showing a plurality of connector carriers seated in respective side channels of a common carrier according to some embodiments.

FIG. 7 is a perspective view of connection system 100 arranged in a pre-staged position in which cable bundle 120 and connectors 150A-150F are arranged in position for mating. In the FIG. 7 example, common carrier 110 is secured in position on substrate 102, on a top surface 106 of ridge 103. Main channel 112 extends along the top surface 106 of the ridge 103, and the cable bundle 120 is arranged in a first direction in the main channel 112. Some cables of the cable bundle 120 are arranged in cable groupings 121A-121C, which are each terminated by terminals (now shown) carried by respective pairs of connectors (e.g., 150A,150F; 150B,150E; 150C,150D). Each pair of connectors is retained in a respective connector carrier 140A-140C through which the cables of the cable groupings 121A-121C extend through the connector carriers 140A-140C.

Figure 8:
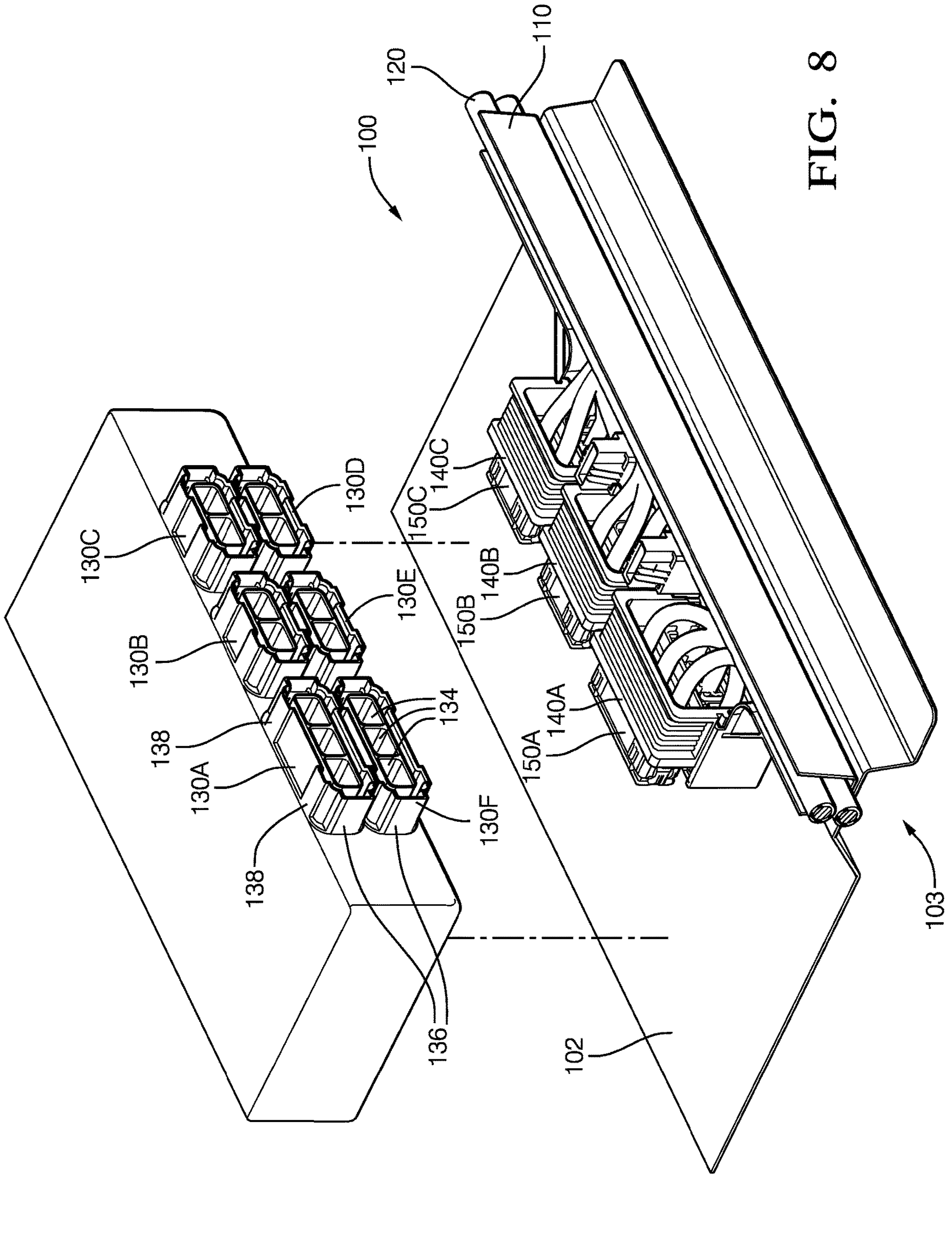
FIG. 8 is a perspective view showing a plurality of connector carriers seated in respective side channels of a common carrier and an Electronic Control Unit (ECU) according to some embodiments.

As shown in the FIG. 7 example, each of connector carriers 140A-140C has been pulled (i.e., in a direction away from main channel 112) past walls 115A-115D, and has been seated in one of the respective side channels 118A-118C (e.g., with rails 146 engaged with tracks 116) and is retained in the side channels 118A-118C laterally moveable (e.g., slidable, in a direction parallel with substrate 102, for example away from main channel 112) in the side channels 118A-118C. In the pre-staged position, connector carriers 140A-140C may be in preparation for mating each pair of connectors, for example by moving (e.g., sliding) each connector carrier 140A-140C longitudinally away the main channel 112 retained in the respective side channels 118A-118C to mate with a corresponding connector interface (e.g., of the ECU 101, as shown in FIG. 8 as one example).

In some examples, the respective pairs of connectors (e.g., 150A,150F; 150B,150E; 150C,150D) are each resettable latching connectors that are configured to be mated and secured by applying a force moving respective inner and outer portions of the connector together to engage corresponding lock features on the inner and outer housing portions until they engage, thereby mating terminals carried by the connector and locking the connector. In some examples, the respective pairs of connectors (e.g., 150A, 150F; 150B,150E; 150C,150D) are self-aligning connectors, for example across x, y, and z axis relative to a lateral mating direction of the connector. In some examples, the respective pairs of connectors (e.g., 150A-150F, 150B-150E, 150C-150D) include mate assurance features that assure that the connector is properly mated.

FIG. 6A depicts one example of a connector 150 that may be used with the connection system 100 described herein. FIG. 6B depicts a cross section view of the connector 150 along the cut lines 6B-6B depicted in FIG. 6A, after the connector 150 has been mated. FIG. 6B depicts an exploded view showing components of the connector 150 depicted in FIGS. 6A and 6B.

Connector 150 may be described as a self-aligning connector with mate assurance features that assure that the connector is properly mated. Connector 150 is configured to be carried and mated by a connector carrier 140 depicted in FIGS. 5A and 5B. For example, connector 150 depicted in FIG. 6A-6C, which carries a pair of terminals, may be used as one or more of connectors 150B, 150C, 150D, and 150E depicted in FIG. 4B, which are each similarly configured to carry two pairs of terminals (not shown) for mating. In other examples not depicted, connector 150 may be modified to carry more, or fewer terminals. For example, connector 150 may be modified to carry a third terminal, and may be used as connector 150A or 150F, which each carry three terminals.

Referring now to FIG. 6C, connector 150 includes an outer housing 152 and an inner housing 154 that fits in the outer housing 152. The inner housing 154 carries a pair of terminal housings 180A, 180B within the inner housing 154. Each terminal housing 180A, 180B is configured to support a pair of terminals for mating. As shown in FIG. 6C, each terminal housing 180A, 180B includes an optional seal 184. As also shown in FIG. 6C, each terminal housing 180A, 180B further includes a terminal position assurance (TPA) feature 186 that stabilizes terminals carried by the terminal housing 180A, 180B for mating. As also shown in FIG. 6C, the TPA feature 186 may include two substantially symmetrical halves 186A, 186B that lock together to secure terminals for mating in the terminal housings 180A, 180B.

As shown in FIG. 6C, outer housing 152 includes features 156 and 158, each arranged on opposed sides of the outer housing 152 and configured to engage with corresponding lugs 157, and mating features 159 arranged on inner housing 154 to mate terminals carried in the inner housing 154. Although not visible in FIG. 6C drawing, the inner housing 154 may include four lugs 157, including a pair on each opposed side of the inner housing 154 that engage with four corresponding mating features 156 on the outer housing 152, and two mating features 159 on other opposed sides of the inner housing 154 that engage with two corresponding mating features 158 on the outer housing 152. To mate connector 150 housing 152 may be seated on inner housing 154, with terminals housings 180A, 180B supporting terminals in the inner housing 154. The connector 150 may be aligned with a corresponding connector interface 130A-130F that carries terminals that correspond to terminals supported by connector 150, for example terminals of an ECU 101 as further described with respect to FIG. 8.

The outer housing 152 is configured such that force moving the outer housing 152 further onto the inner housings 154 (e.g., by a robotic actuator moving a connector carrier 140 that supports the connector 150 against a connector interface 130A-130F of an ECU 101 as shown in FIG. 8) which causes a pair of lugs 157 on the inner housing 154 to push apart and move past a pair of fingers of mating feature 156 to a void between the fingers which interact with the lugs 157 to retain the outer and inner housings together. In addition, a force moving the outer housing 152 further onto the inner housing 154 mates the terminals carried by the inner housing 154 to be mated with corresponding terminals of the ECU 101.

In addition, moving the outer housing 152 onto the inner housing 154 causes features 158 and 159 to engage with channels 136, 138 of a connector interface 130A-130F as shown in FIG. 8, which self-aligns the connector 150 with the respective connector interface 130A-130F. The connector 150 may be moved forward until the mating features 156, 158 and engage with a flexible latch (not shown) in one or more of the channels 136, 138 to lock the connector to the respective connector interface 130A-130F.

FIG. 8 is a perspective view of a connection system 100 that includes a common carrier 110 arranged on a substrate 102 in preparation for mating, and an electronic control unit 101. Connection system 100 is configured to couple cables of cable bundle 120 to terminals of ECU 101, in order to electrically coupled the cables to one or more components housed within the ECU 101, or to other conductors coupled to other components housed outside the ECU 101.

The ECU 101 as described herein is a protective housing that carries one or more electrical system components within the housing and enables electrical connection to the one or more components. For example, ECU 101 may carry within the housing that carry electrical system components such as semiconductor devices, processors, microprocessors, microcontrollers, digital signal processors, graphics processors, artificial intelligence processors, memories, data storage, power management circuitry, communications interfaces, and the like. These system components may be mounted one or more printed circuit boards (PCB) housed within the ECU 101 coupled to one or more output interfaces on of the ECU 101 via traces on the PCB or other conductors housed in the ECU 101.

The example ECU 101 of FIG. 8 includes a plurality of connector interfaces 130A-130F that are each configured the engage with a plurality of connectors 150A-150F arranged for mating in common carrier 110. As shown FIG. 8, each connector interface 130A-130F includes a plurality of terminal apertures 134 each configured to support an ECU terminal (not shown) for mating. Some of the connector interfaces 130B-130E, include two terminal apertures 134 configured to support a pair of ECU terminals for mating. Other of the connector interfaces 130A, 130F include three terminal apertures 134 configured to support three ECU terminals side by side for mating.

As also shown in the FIG. 8 example, each connector interface 130A-130F includes two pair of channels 138 on opposed elongate sides of each connector interface 130A-130F configured to engage with mating features 156 (an exterior profile of feature 156) of connectors 150A-150F, as well as a pair of channels 136 on other opposed sides of the connector interfaces 130A-130F configured to engage with corresponding features 158 of connectors 150A-150F.

In some examples, the channels 138 and/or the channels 136 receive corresponding mating features 156, 158 to self-align the connectors 150A-150F on the respective connector interfaces 130A-130F during the mating process and to lock the connectors 150A-150F to the connector interfaces 130A-130F. According to these examples, the mating features 156, 158 serve a dual purpose. An interior profile of the features 156, 158 (e.g., the fingers and void of feature 156 described above) on the outer housing 152 engages with corresponding features of the inner housing 154 to mate terminals and lock the inner and outer housings 152, 154 together as described above, while an outer profile of the features 156, 158 engages with the connector interface 130A-130F channels 136, 138 to self-align the connectors 150A-150F and lock them to the respective connector interface 130A-130F. For example, one or more of the channels 136, 138 of the connector interfaces 130A-130F may include a flexible latch (not shown) that engages with the corresponding features 156, 158 of the outer housing 152 when connectors 150A-150F are moved to a fully seated position in the connector interfaces 130A-130F to lock the connectors 150A-150F to the respective the connector interfaces 130A-130F.

Figure 9:
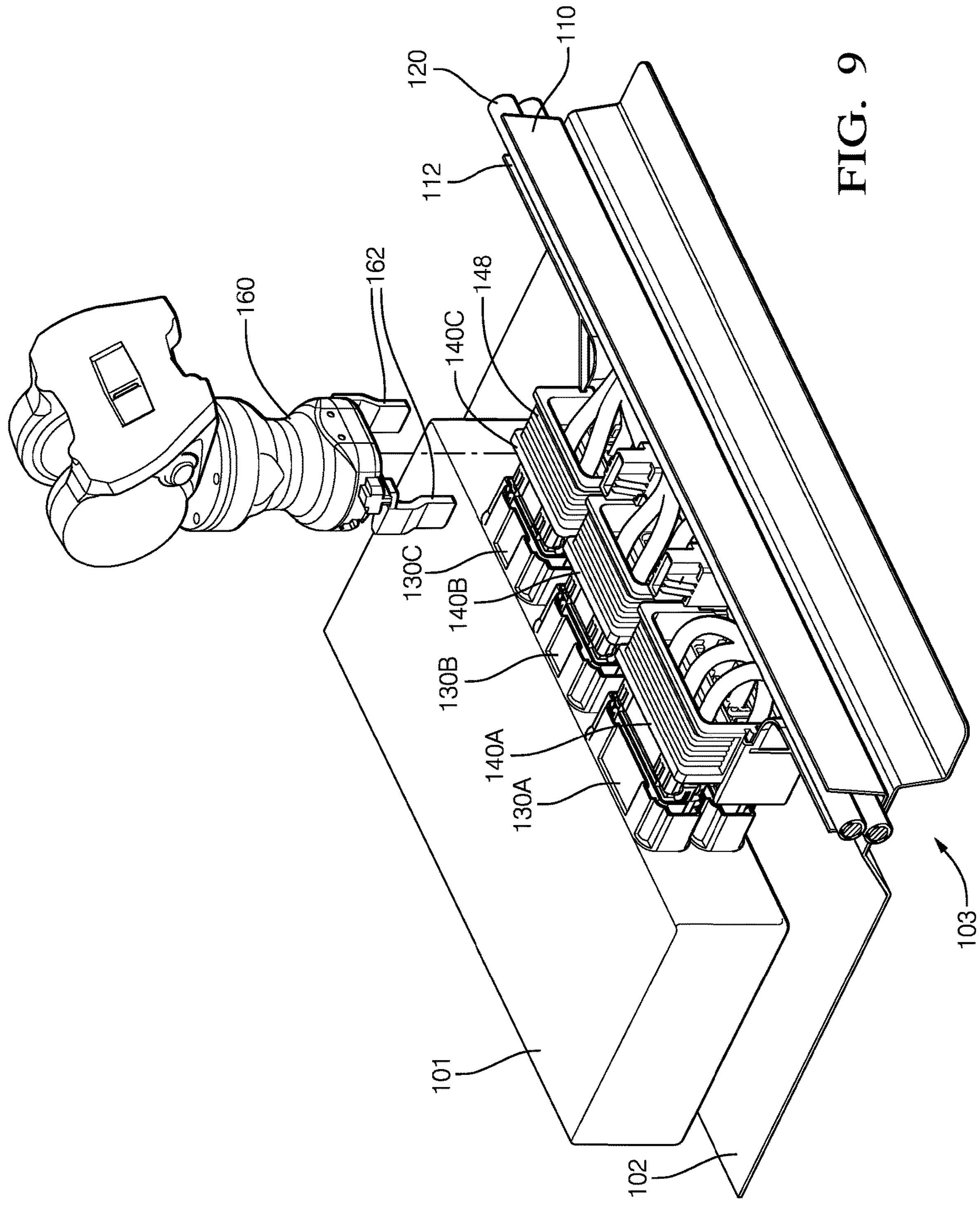
FIG. 9 is a perspective view showing a plurality of connector carriers seated in respective side channels of a common carrier, an adjacent Electronic Control Unit (ECU), and a robotic actuator according to some embodiments.

FIG. 9 is a perspective view showing connection system 100 prepared for mating the connectors 150A-150F to the ECU 101. As shown in FIG. 9, the common carrier 110 is secured in position on the substrate, cable bundle 120 arranged in main channel 112, and connectors retained by connector carriers 140A-140C in the side channels 118A-118C, as shown in the example of FIGS. 7-8. In FIG. 9, ECU 101 has been arranged on the substrate 102, in preparation for mating. As shown in the FIG. 9 example, ECU 101 is arranged on the substrate 102 adjacent to the common carrier 110, specifically adjacent to the side channels 118A-118C of the common carrier 110 that carry the connector carriers 140A-140C, which carry connectors 150A-150F, prepared for mating. As shown in FIG. 9, a robotic actuator 160, which includes gripping fingers 162 has been moved over the connection system 100, in preparation to make the connectors 150A-150F via the connector carriers 140A-140C retained by the common carrier 110.

Figure 10A:
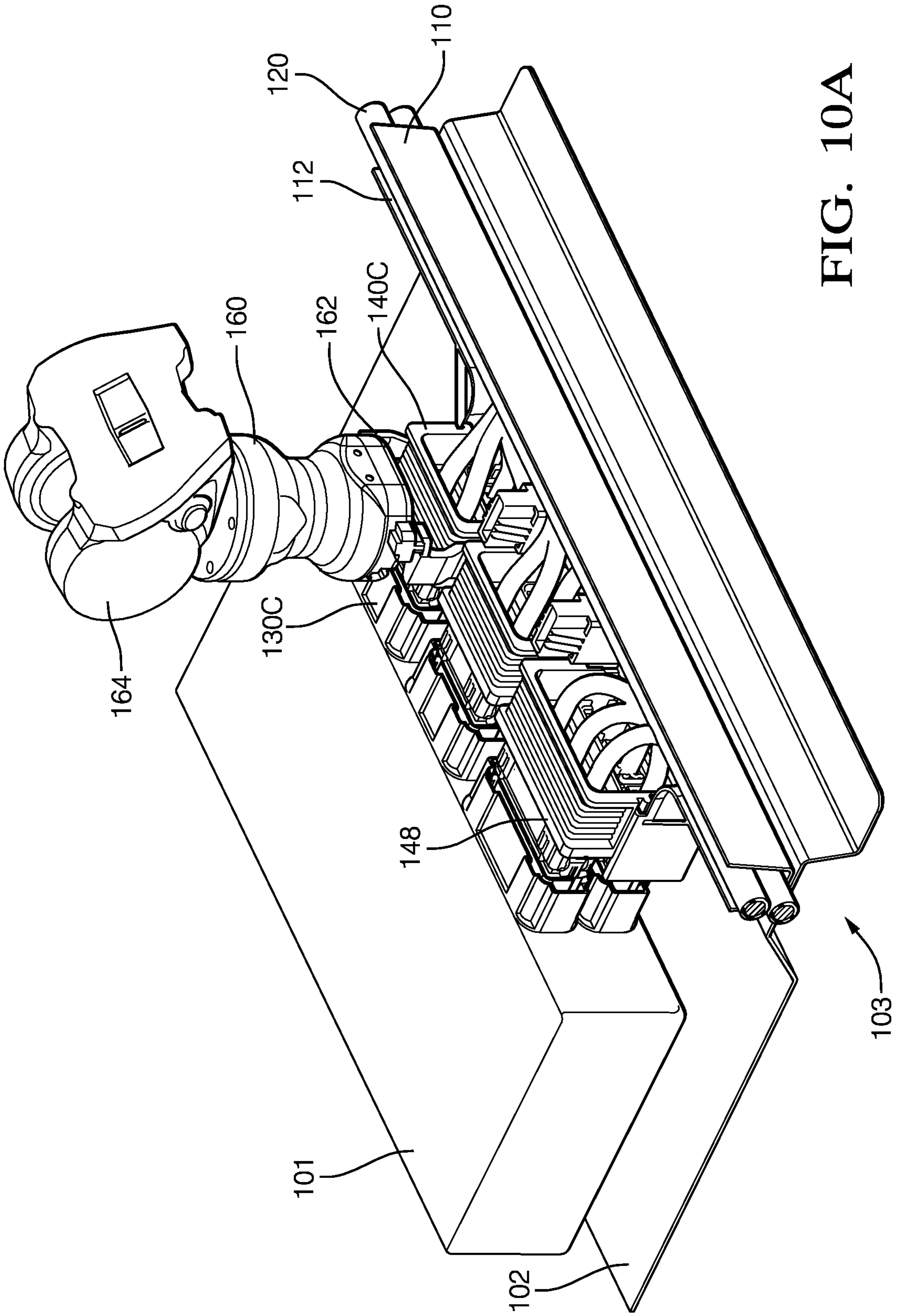
FIG. 10A is a perspective view showing a connector carrier in a pre-staged position, ready to be moved to a staged position by a robotic actuator according to some embodiments.
Figure 10B:
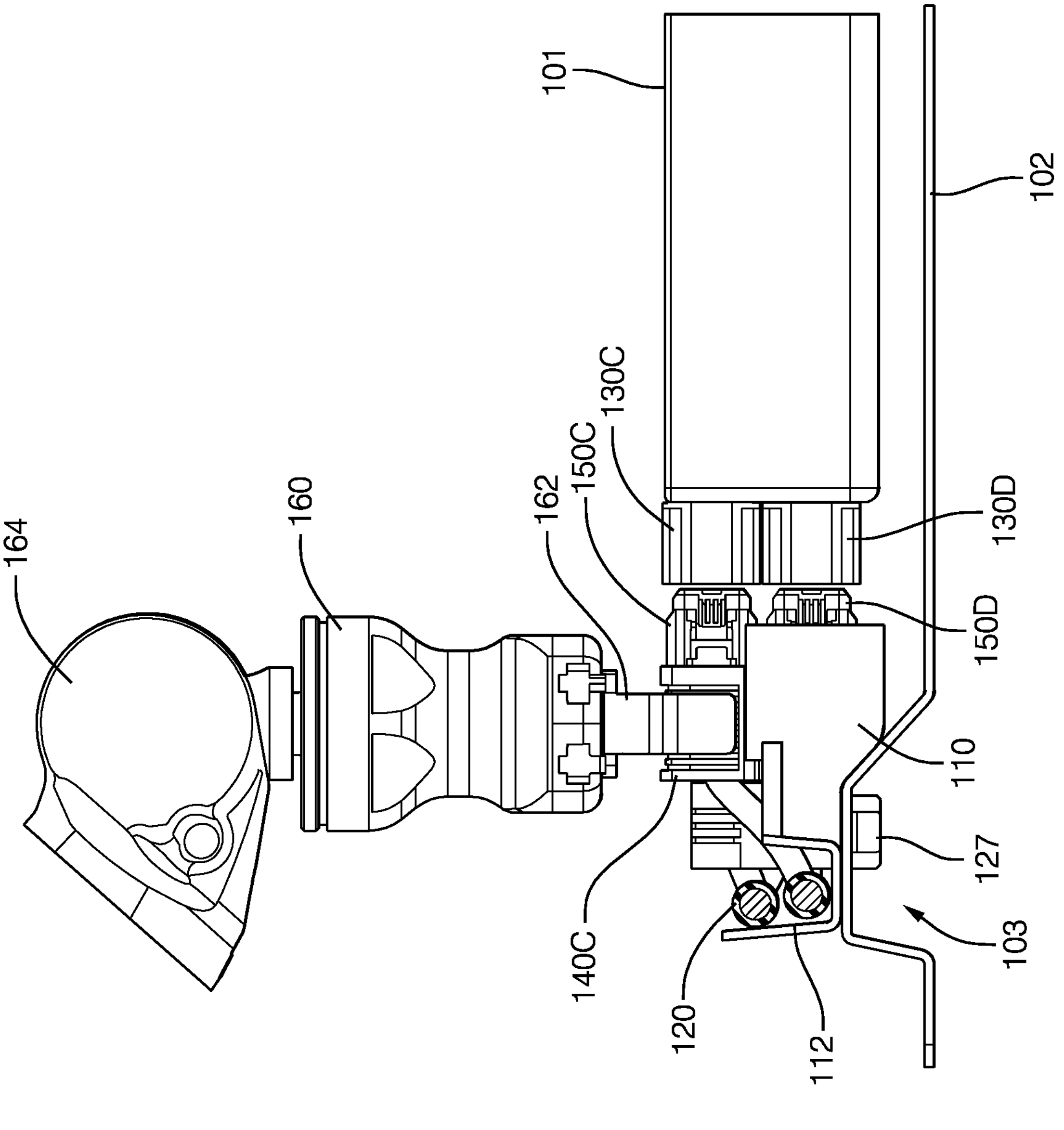
FIG. 10B is a side view showing a connector carrier in a pre-staged position, ready to be moved to a staged position by a robotic actuator according to some embodiments.

FIG. 10A is a perspective view of the connection system 100, with a robotic actuator 160 gripping a connector carrier 140C to mate connectors 150C and 150D. FIG. 10B shows a side view of the connection system 100 depicted in FIG. 10A. As shown in FIGS. 10A and 10B, common carrier 110 and ECU 101 are arranged adjacent to one another on substrate 102, and connectors 150C and 150D are in a position prepared to be mated, with connector carrier 140C gripped by robotic actuator fingers 162 via recessed gripping surface 148.

Figure 11A:
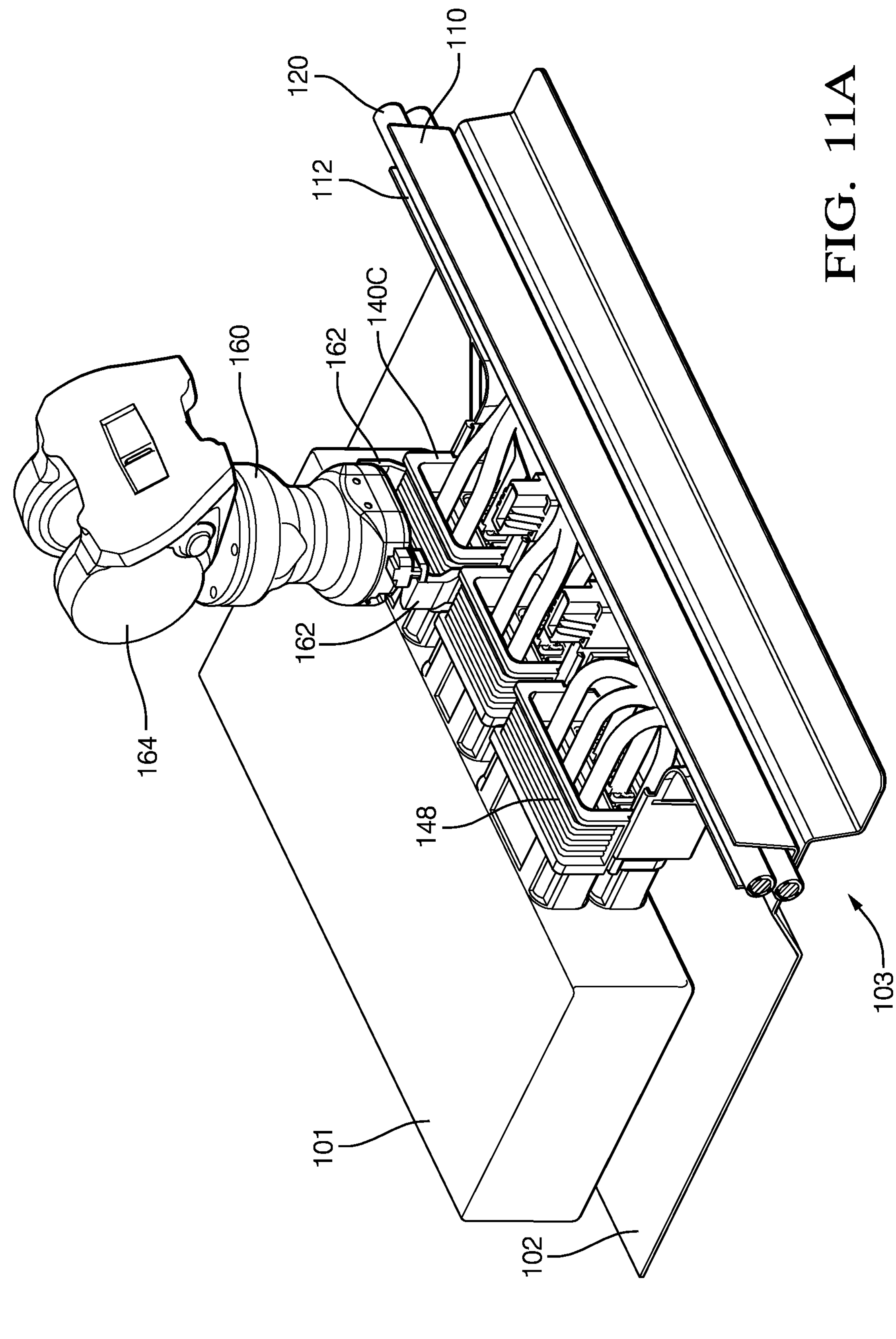
FIG. 11A is a perspective view showing a connector carrier after it has been moved to a staged position by a robotic actuator according to some embodiments.
Figure 11B:
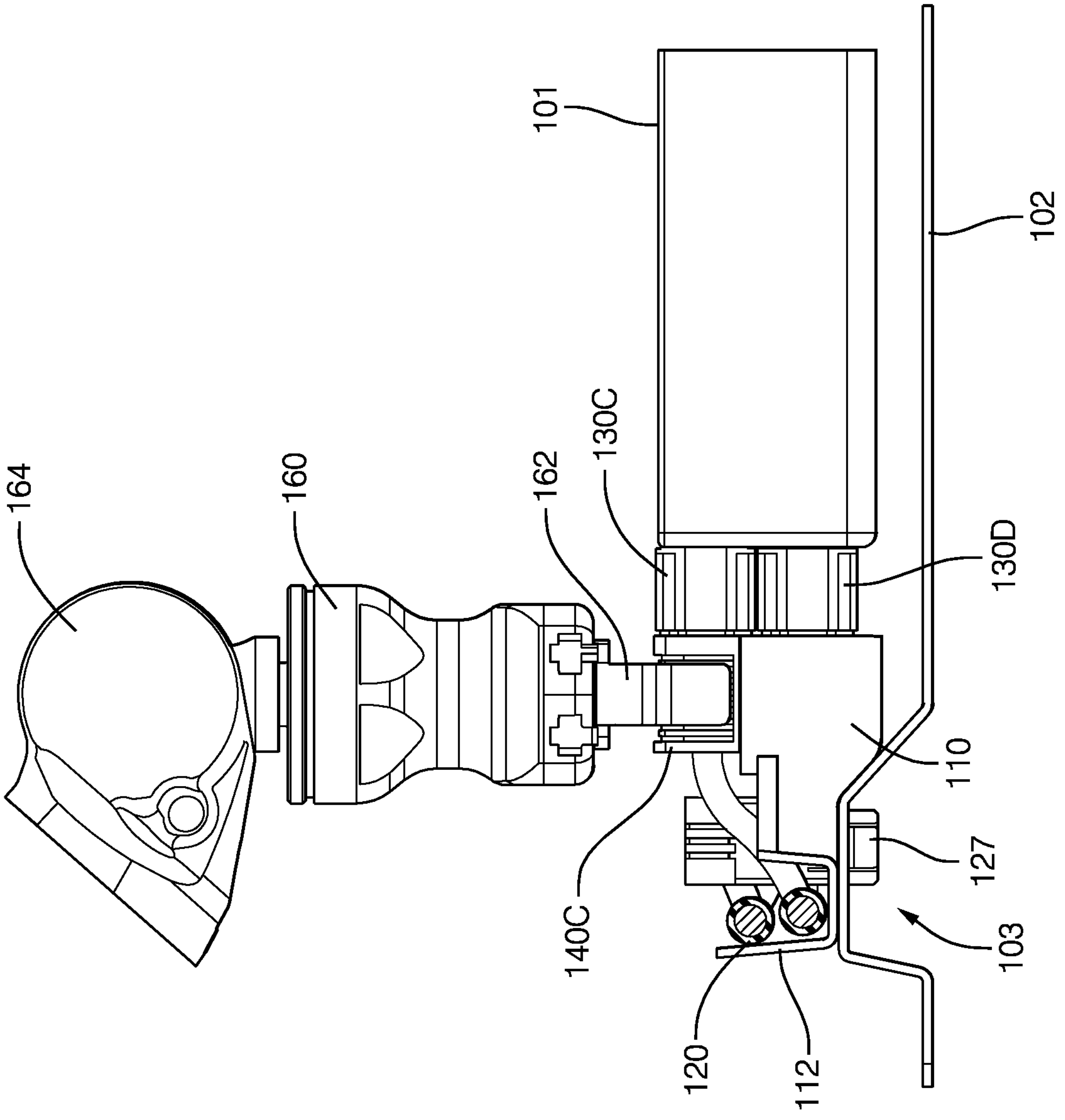
FIG. 11B is a perspective view showing a connector carrier after it has been moved to a staged position by a robotic actuator according to some embodiments.

FIG. 11A is a diagram showing the connection system 100, after a robotic actuator 160 has mated and locked connectors 150C and 150D via connector carrier 140C. FIG. 11B is a side view of connection system 100, after the robotic actuator 160 has mated connectors and 150C and 150D via connector carrier 140C. The connectors 150C and 150D were mated and locked by moving connector carrier 140C laterally (e.g., towards ECU 101) within side channel 118C, which causes the connectors 150C and 150D to self-align to connector interfaces 130C and 130D via features 156, 158 of the connectors 150C and 150D engaged with channels 136, 138. The robotic actuator 160 has moved the connector carrier 140C laterally further in the side channel 118C until the connectors 150C and 150D are fully seated in the ECU connector interfaces 130C and 130D, which mates terminals carried by the connectors 150C and 150D to corresponding terminals of the ECU 101, and locks the connectors 150C and 150D to the ECU 101 (e.g., to the connector interfaces 130C and 130D). As shown in FIG. 11B, once each of connectors 150C, 150D are mated and locked to the ECU 101, connector carrier 140C is arranged proximal to and separate from the mated connectors 150C, 150D, i.e., connector carrier 140C is disengaged from and not locked (and/or not lockable) to connector 150C, 150D once the connectors 150C, 150D are mated and locked to the ECU 101. As also shown in FIG. 11A, common carrier 110 remains retained in side channel 118C once connectors 150C, 150D have been mated and locked to the ECU 101. For example, rails 146 may remain engaged with tracks 116 in the walls 115C, 115D of the side channel 118C after connectors 150C and 150D have been mated and locked to the ECU 101.

In some examples, connection system 100 may be mated by sequentially mating and locking each remaining pair of connectors 150B-150E, 150A-150F as described above, by gripping, via recessed gripping surface 148, each connector carrier 140B, 140A, and moving it laterally (e,g, substantially parallel to the substrate 102) in the respective side channel 118A, 118B, towards the ECU 101 until each pair of connectors is mated and locked to the corresponding connector interfaces 130B, 130E and 130A, 130F. For example, to complete installation of connection system 100, the robotic actuator 160 may first grip connector carrier 140B, and move it laterally in side channel 118B (e.g., towards ECU 101) until third and fourth pairs of terminals (not shown) carried by connectors 150B and 150E are mated and the connectors 150B and 150E are locked to the ECU 101. The robotic actuator 160 may grip connector carrier 140C, and move it laterally in side channel 118C until the three terminals carried by each of connectors 150A and 150F are mated and the connectors 150A and 150F are locked to the ECU 101. In this manner, the robotic actuator 160 sequentially engages each connector carrier 140A-140C, until all of the connectors 150A-150F are mated and locked to the ECU 101, as shown in the example of FIG. 1.

Figure 12:
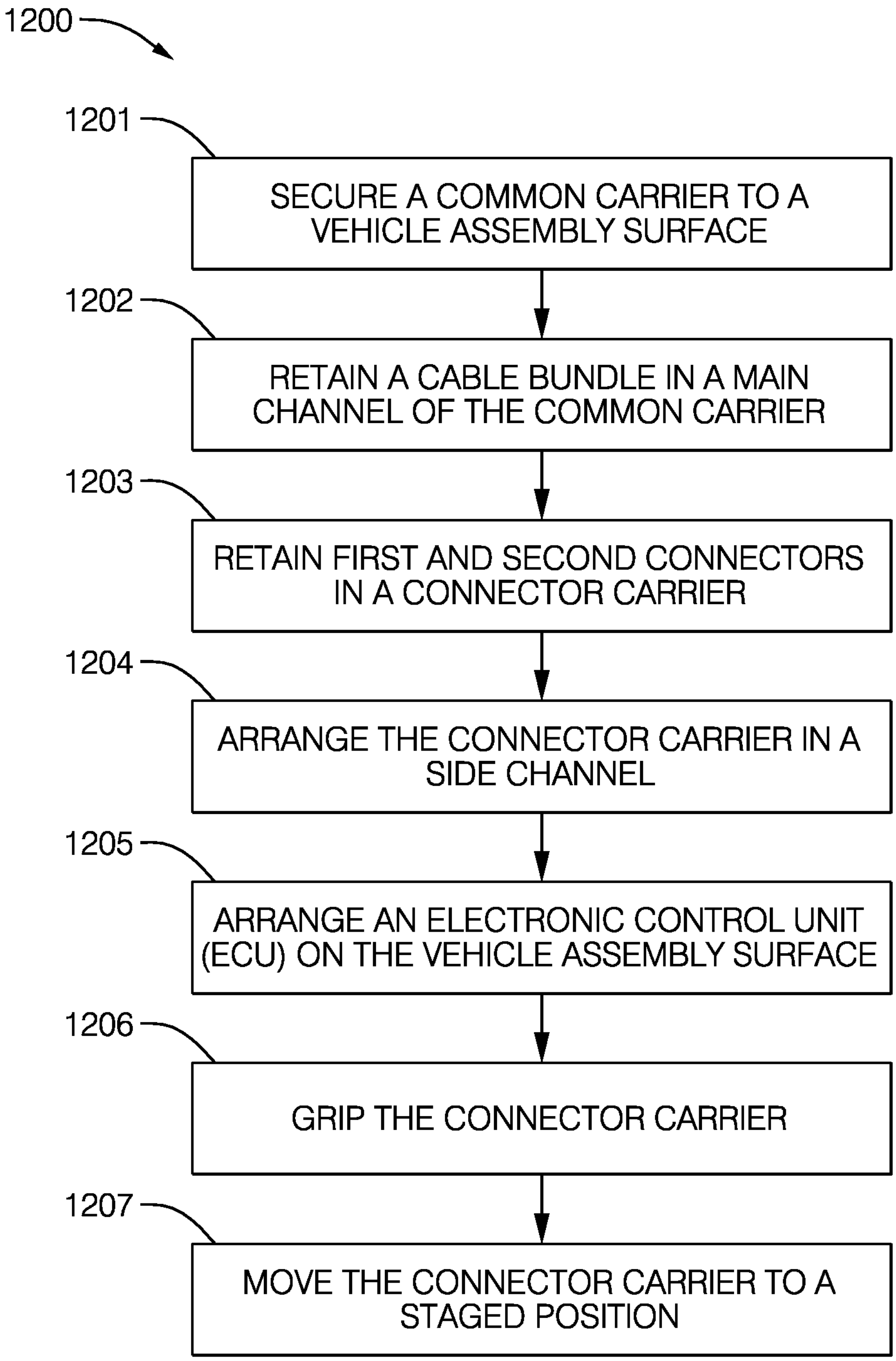
FIG. 12 is a flow diagram that depicts one example of a method according to some embodiments.

FIG. 12 is a flow diagram that depicts one example of a method 1200 according to some embodiments. As shown in FIG. 1, at step 1201, the method includes securing a common carrier (e.g., 110) to a substrate (e.g., 102) of a vehicle assembly. As also shown in FIG. 12, at step 1202, the method includes retaining a cable bundle (e.g., 120) of a wiring harness in a main channel (112) of the common carrier, for example arranged in a first direction in the common carrier.

As also shown in FIG. 12, at step 1203, the method further includes retaining first and second connectors (e.g., 150C, 150D) in a connector carrier (e.g., 140C). As also shown in FIG. 12, at step 1203, the method further includes seating the connector carrier in a side channel (e.g., 118C) of the common carrier in a pre-staged position. The side channel may be arranged in a second direction different than the first direction in which the cable bundle is arranged in the main channel, for example perpendicular to the first direction. The side channel may include a pair of tracks (e.g., 116) configured to engage with a pair of rails (e.g., 146) on the connector carrier to retain the connector carrier moveable (e.g., slideable) in the side channel.

As also shown in FIG. 12, at step 1204, the method further includes arranging an electronic control unit (e.g., 101) on the substrate of the vehicle assembly, for example adjacent to the common carrier. As also shown in FIG. 12, at step 1204, the method further includes gripping the connector carrier, for example by robotic gripping fingers 162 of a robotic actuator 160 that grip recessed grip a recessed griping surface 148 of the connector carrier.

As also shown in FIG. 12, at step 1204, the method further includes moving, for example by the robotic actuator 160, the connector carrier to a staged position in the side channel, which mates the first and second connectors (e.g., respective terminals carried by the first and second connectors 150C, 150D) and locks the first and second connectors to the ECU.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An electrical connection system, comprising:

a cable bundle comprising a plurality of cables;

a first connector that carries a first pair of terminals that terminate a first pair of the plurality of cables;

a second connector that carries a second pair of terminals that terminate a second pair of the plurality of cables;

a connector carrier configured to retain the first connector and the second connector; and a common carrier configured to be secured to a substrate of a vehicle assembly that includes:

a main channel configured to retain the cable bundle arranged in a first direction; and a side channel that retains the connector carrier in the side channel such that the connector carrier is moveable in a second direction different than the first direction from a pre-staged position in the side channel to a staged position which:

mates the first pair of terminals carried by the first connector;

mates the second pair of terminals carried by the second connector; and locks the first connector and the second connector to an Electronic Control Unit (ECU).

2. The electrical connection system of claim 1, wherein the connector carrier is separate from the ECU in the staged position.

3. The electrical connection system of claim 1, wherein the connector carrier is not lockable to the ECU.

4. The electrical connection system of claim 1, wherein the side channel comprises a pair of walls that include tracks that engage with rails on sides of the connector carrier to retain the connector carrier in the side channel.

5. The electrical connection system of claim 4, wherein the connector carrier is retained by the rails engaged with the tracks in the staged position.

6. The electrical connection system of claim 1, wherein the first connector and the second connector each include a housing with lock features that engage with corresponding lock features of the ECU to lock the first connector to the ECU and the second connector the ECU.

7. The electrical connection system of claim 1, wherein the first connector and the second connector are resettable latching connectors.

8. The electrical connection system of claim 1, wherein the connector carrier comprises a grip surface that is recessed to accommodate fingers of a robotic actuator.

9. The electrical connection system of claim 1, wherein the connector carrier is a first connector carrier, the side channel is a first side channel, and wherein the common carrier further includes:

a second side channel that retains a second connector carrier that retains a third connector that carries a third pair of terminals and a fourth connector that carries a fourth pair of terminals such that the second connector carrier is moveable in the second direction from the pre-staged position in the second side channel to a staged position in which:

the third pair of terminals are mated;

the fourth pair of terminals are mated; and the third connector and the fourth connector are locked to the ECU.

10. A method, comprising:

securing a common carrier at a location on a substrate of a vehicle assembly;

retaining a cable bundle of a wiring harness in a main channel of the common carrier arranged in a first direction;

retaining, in a connector carrier, a first connector that carries a first pair of terminals that terminate a first pair of cables of the cable bundle; and a second connector that carries a second pair of terminals that terminate a second pair of cables of the cable bundle;

arranging the connector carrier in a side channel of the common carrier that retains the connector carrier moveable in a second direction from a pre-staged position to a staged position;

arranging an Electronic Control Unit (ECU) on the substrate of the vehicle assembly adjacent to the common carrier;

gripping the connector carrier; and moving the connector carrier, retained in the side channel, from the pre-staged position to the staged position, thereby mating the first pair of terminals and the second pair of terminals, and locking the first connector and the second connector to the ECU.

11. The method of claim 10, wherein moving the connector carrier, retained in the side channel, to the staged position comprises moving the connector carrier forward until the connector carrier is proximal to and separate from the ECU.

12. The method of claim 10, wherein moving the connector carrier to the staged position does not lock the connector carrier to the ECU.

13. The method of claim 10, wherein the side channel comprises:

a pair of walls that include tracks that engage with rails on sides of the connector carrier to retain the connector carrier in the side channel; wherein moving the connector carrier, retained in the side channel, to the staged position comprises moving the connector carrier forward in the side channel, retained by the rails engaged with the tracks.

14. The method of claim 13, wherein the connector carrier is retained by the rails engaged with the tracks when moved to the staged position.

15. The method of claim 10, wherein the first connector and the second connector each include a housing with lock features that engage with corresponding lock features of the ECU to lock the first connector and the second connector to the ECU.

16. The method of claim 10, wherein the first connector and the second connector are resettable latching connectors.

17. The method of claim 10, wherein gripping the connector carrier comprises gripping by fingers of a robotic actuator on a gripping surface that is recessed to accommodate the fingers of the robotic actuator.

18. The method of claim 10, wherein the connector carrier is a first connector carrier, the side channel is a first side channel, and further comprising:

retaining, in a second connector carrier, a third connector that carries a third pair of terminals that terminate a third pair of cables of the cable bundle and a fourth connector that carries a fourth pair of terminals that terminate a fourth pair of cables of the cable bundle;

retaining the second connector carrier in a second side channel;

gripping the second connector carrier; and moving the second connector carrier, retained in the second side channel, to the staged position, thereby mating the third pair of terminals, mating the fourth pair of terminals, and locking the third connector and the fourth connector to the ECU.

19. A common carrier, comprising:

a main channel configured to retain a cable bundle of a wiring harness arranged in a first direction; and a side channel configured to retain a connector carrier that retains a first connector that terminates a first pair of cables of the cable bundle and a second connector that terminates a second pair of cables of the cable bundle, wherein the connector carrier is moveable in a second direction from a pre-staged position in the side channel to a staged position that mates terminals of the first connector and the second connector to corresponding terminals of an electronic control unit (ECU), and lock the first and second connectors to the ECU.

20. The common carrier of claim 19, wherein the connector carrier is separate from the ECU in the staged position.

* * * * *